No. 810,252. PATENTED JAN. 16, 1906.
G. C. E. DE BONNECHOSE.
TURBINE ENGINE.
APPLICATION FILED DEC. 30, 1904.
3 SHEETS—SHEET 1.
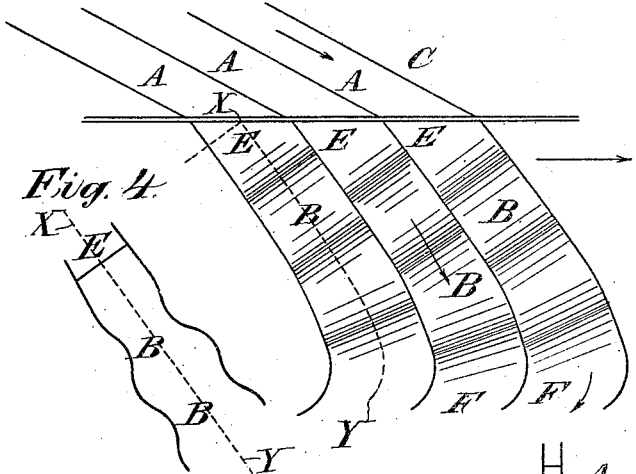
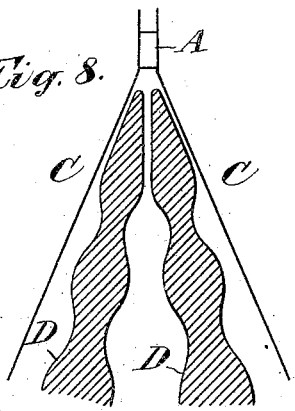
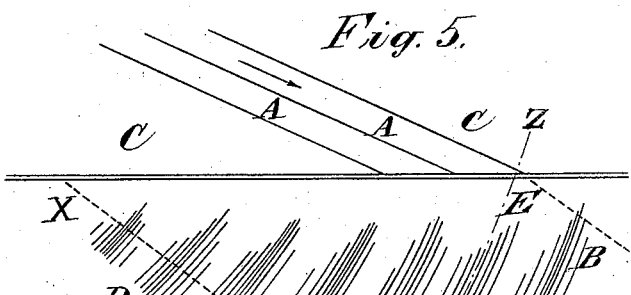
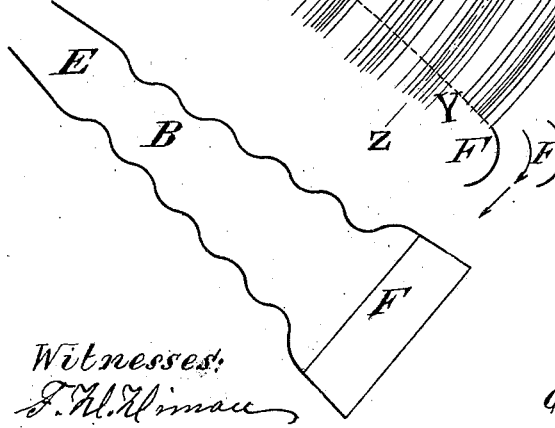
Witnesses:
Inventor
Gaston Charles Emile de Bonnechose
by Henry Connett
Attorney No. 810,252. PATENTED JAN. 16, 1906.
G. C. E. DE BONNECHOSE.
TURBINE ENGINE.
APPLICATION FILED DEC. 30, 1904.

3 SHEETS—SHEET 2.

Witnesses:

Inventor:
Gaston Charles Emile de Bonnechose
by Henry Connett
Attorney

No. 810,252. PATENTED JAN. 16, 1906.
G. C. E. DE BONNECHOSE.
TURBINE ENGINE.
APPLICATION FILED DEC. 30, 1904.

3 SHEETS—SHEET 3.

Witnesses:
Inventor:
Gaston Charles Emile de Bonnechose
by
Attorney

UNITED STATES PATENT OFFICE.

GASTON CHARLES EMILE DE BONNECHOSE, OF PARIS, FRANCE.

TURBINE-ENGINE.

No. 810,252.                Specification of Letters Patent.           Patented Jan. 16, 1906.

Application filed December 30, 1904. Serial No. 238,940.

*To all whom it may concern:*

Be it known that I, GASTON CHARLES EMILE DE BONNECHOSE, a citizen of the French Republic, residing in Paris, France, have invented certain new and useful Improvements in Turbine-Engines, of which the following is a specification.

This invention relates to rotary engines or turbines which employ elastic fluids under pressure, and has for its object to provide such an engine which may be used as a motor or a compressor and which may be operated with any kind of gaseous elastic fluids, such as steam, compressed air, products of combustion, and the like. In this engine or device are utilized the successive reciprocal thrust or reactions between an elastic fluid under pressure emitted from fixed adjutages and buckets or similar devices on a rotatable wheel, the buckets or its equivalent having a conduit or passage for the fluid which is contracted at one or more points in its length. Usually this contraction will be effected by giving an undulatory contour to one or both of the lateral walls of the conduit or passage, as will be hereinafter explained. This conduit may be as a whole annular and concentric with the axis of the carrying-wheel, or it may be divided by equally-spaced partitions disposed symmetrically about said axis and having a uniform obliquity to the radius of the wheel.

Figure 9:
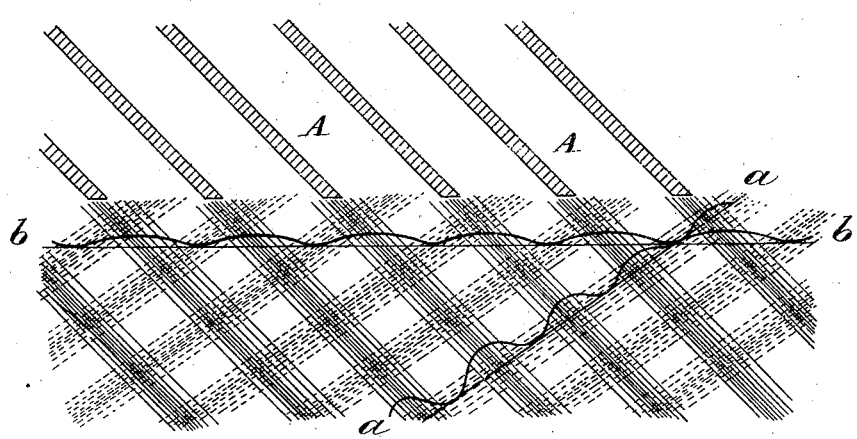
Figure 10:
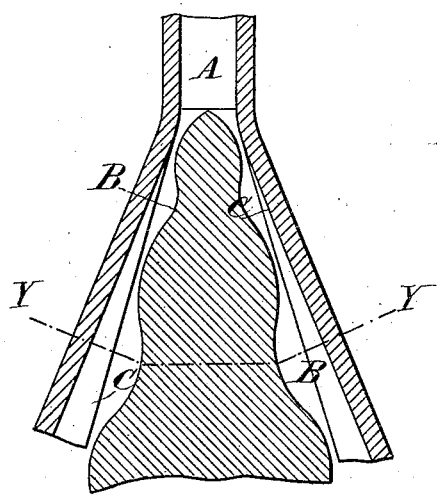
Figure 11:
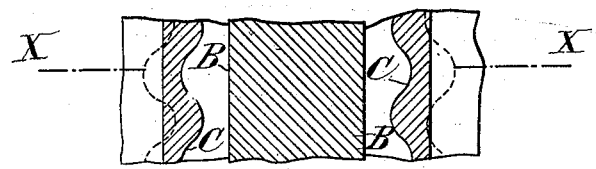
Figure 13:
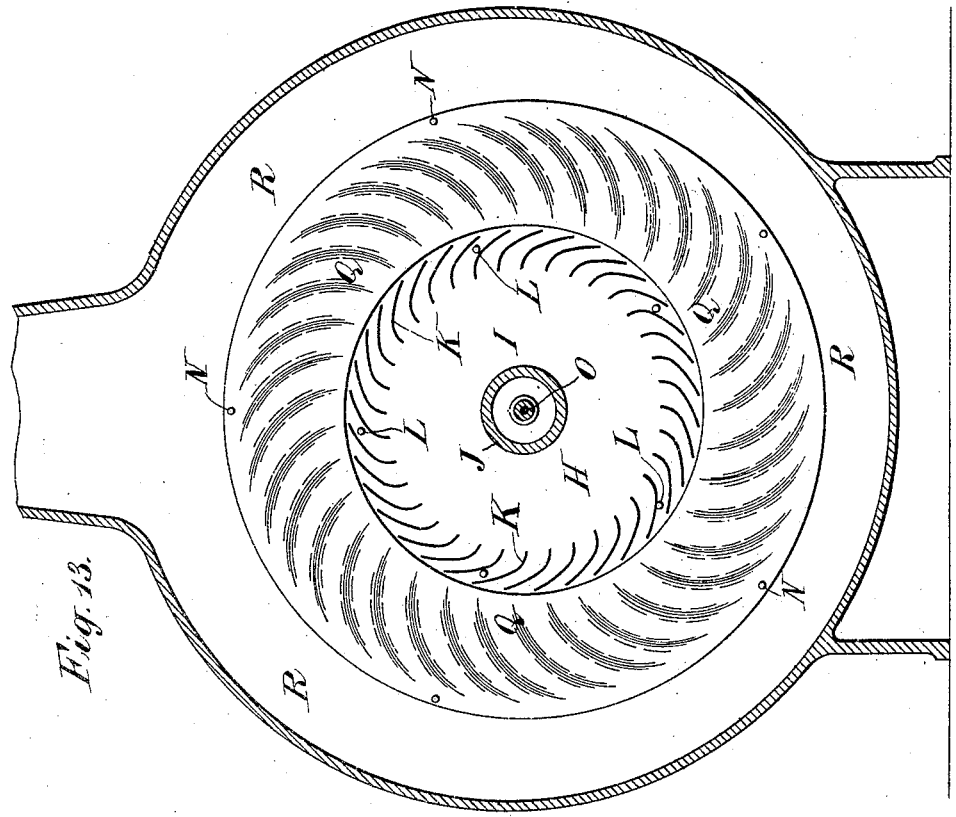
Figure 12:
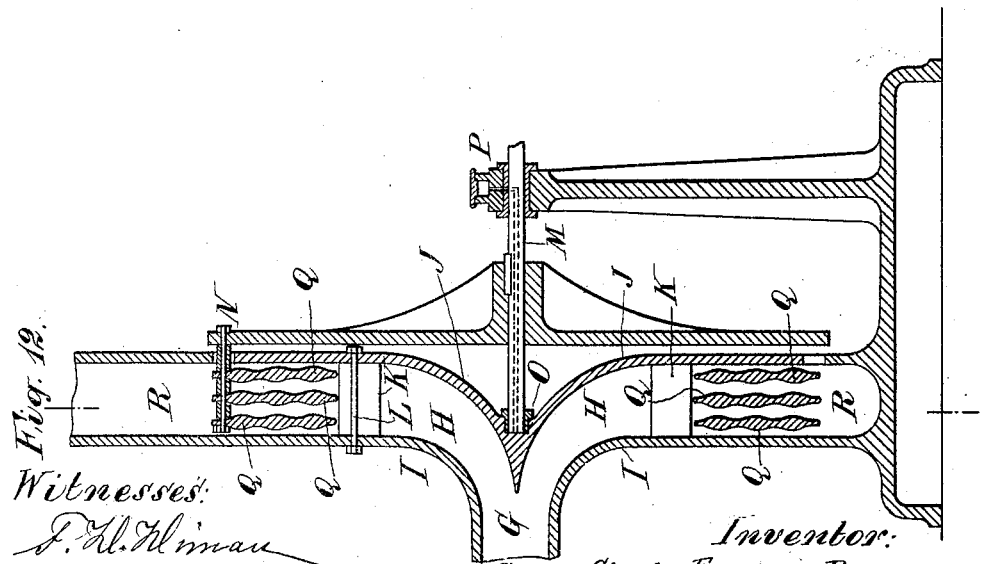

In the accompanying drawings, which illustrate several forms of the engine, Figure 1 is a diagrammatic view showing a bucket having the passage therein provided with a single contraction formed by the undulating lateral walls of the bucket. Fig. 2 is a sectional view of a part of the crown or peripheral portion of the wheel or rotary part of an axial turbine developed, the plane of the section being at right angles to the turbine-axis and along line X Y in Fig. 4. Fig. 3 is a cross-section of one of the fixed adjutages A. Fig. 4 is a section through a bucket B at line X Y in Fig. 2. In the construction seen in Fig. 2 the buckets are in series separated by partitions. Fig. 5 is a section similar to Fig. 2 developed, showing the bucket-ring of annular form and without partitions. Fig. 6 is a section at Z Z in Fig. 5, and Fig. 7 is a section at X Y in Fig. 5. Fig. 8 is a sectional view illustrating another way of forming the contractions in the conduits of the buckets or bucket-ring of the turbine. Figs. 9, 10, and 11 are sectional views illustrating another way of producing the contractions and expansions in the bucket-conduit by undulations in its walls. Fig. 9 is a diagrammatic elevation showing the parts developed and the adjutages in section. Fig. 10 is a transverse section at X X in Fig. 11, and Fig. 11 is a section at line Y Y in Fig. 10. Figs. 12 and 13 illustrate the invention as applied to a centrifugal turbine-engine, the former being a vertical axial section in plane of the shaft and the latter a section at right angles thereto through the casing of the engine.

In Figs. 1, 2, 5, 8, 9, and 10, A designates the fixed adjutages through which the compressed fluid flows to the buckets of the turbine or rotary part, and in Figs. 1, 2, 4, 5, 6, 7, 10, and 11 B designates the undulating walls of the passage or conduit in the bucket or bucket-ring of the rotary part. This passage or conduit is capable of being formed or produced in many ways, as will be hereinafter described. The forms shown in Figs. 1 to 7 will be first described.

Fig. 1 shows a bucket formed of two undulating lateral walls producing a single contraction of the passage through it. The fluid enters it at the outer end from the adjutage A. The axis of the curvature of the wall at the contracted part will be perpendicular to the direction of the flow of the fluid, or nearly so. In Figs. 2 and 4 the bucket is shown as having two contractions in the length of the conduit or passage through it, and the buckets are separated by partitions equally spaced and terminating at their inner ends in curved blades F. At their outer ends the buckets abut against a wheel-rim apertured or ported at E to admit the fluid from the adjutages to the respective buckets of the series. In Figs. 2 and 5 the curve of the parts is developed into a straight line for convenience of illustration.

In the species illustrated in Figs. 5, 6, and 7 the construction is substantially the same as that of Fig. 2, except that the partitions between the buckets of the series are omitted, and the lateral walls of the bucket device form an annulus or ring provided with suitably-spaced curved blades F. In this construction also the contracted parts of the conduit through which the fluid flows are more numerous, five being seen in Fig. 7, and the degree of contraction becomes gradually less and less from E to F.

The construction shown in Fig. 8, which is a transverse section, illustrates how three conduits with contractions may be formed in the bucket-ring of the rotary part. In this construction the wheel-rim or bucket-ring has a central passage or conduit formed of two parts D, the inner and outer lateral faces of which have undulating contours and two outer passages or conduits, the exterior walls of which are formed of fixed ring-plates C. These latter form a flared casing connected with the adjutages A. Thus the contractions in the outer conduits are formed wholly by the undulating surfaces of the part D.

In the construction illustrated in Figs. 9, 10, and 11 the rim of the turbine-wheel, the rotary part, has undulating lateral outer faces, and the fixed casing C has also undulating inner faces. The rounded ribs forming the undulating inner faces of the casing C, however, extend substantially parallel with the axes of the adjutages A, while those on the rotary part extend substantially at right angles to those on the fixed part. Thus the undulating inner surfaces of the casing serve somewhat as extensions of the adjutages A.

Figs. 12 and 13 illustrate a construction wherein the flow of the fluid is outward radially through a bucket-rim on the rotary part, having conduits provided with contractions similar to those described. In this construction, which is that of a fluid motor, the fluid enters a chamber H in a casing I J through an inlet G and flows through adjutages between fixed directors K to the bucket-ring Q of the wheel M, carried by a shaft or arbor having bearings at O and P. The directors K are fixed in the casing by bolts L, and the bucket-rim Q is secured to the wheel M by arms N. The fluid impinging upon and passing through the bucket-rim Q finally escapes at the exhaust R.

The bucket-rim in Figs. 12 and 13 is herein shown as composed of three rings placed abreast and having undulating lateral surfaces.

Obviously an engine of this kind may be driven by a fluid to serve as a motor or be driven by power to serve as a compressor of fluids.

The construction described reduces to a considerable extent the circumferential velocity of the turbine as compared with other motors, and thus reduces the angular velocity.

Having thus described my invention, I claim—

1. A rotary turbine device for the purpose specified, having a plurality of buckets composed of conduits, each conduit having a succession of alternating contractions and enlargements of its width, which latter increases in a direction from one end toward the other of the conduit, and having an undeviating central vein through said conduit.

2. A rotary turbine device for the purpose specified, having a plurality of buckets formed of laterally-undulating walls, and of partitions, the same being disposed to form conduits each with a succession of alternating contractions and enlargements of its width, which increase progressing in the direction from one end toward the other of the passage through the conduit, said passage having an undeviating central vein.

3. A rotary turbine device for the purpose specified, having a plurality of buckets, each provided with laterally-undulating walls, the undulations in said opposite walls being so disposed and alined as to form a succession of alternating contractions and enlargements of the passage through the conduit, and substantially normal to the flow of fluid in the turbine.

4. A rotary turbine device for the purpose specified, having a plurality of buckets, each provided with laterally-undulating walls, the undulations in said opposite walls being so disposed and alined as to form a succession of alternating contractions and enlargements of the passage through the conduit, and said buckets each provided at the fluid-outlet with a curved wall to utilize the live force remaining in changing the relative velocity of the fluid.

5. A rotary turbine device for the purpose specified, formed of a disk, hollow interiorly in such a manner as to present a series of undulations substantially normal to the flow of the fluid through the interior of said disk, the interior space thus formed augmenting in section from one end toward the other, as set forth.

6. A rotary turbine device for the purpose specified, formed of a disk, hollow interiorly in such a manner as to present a series of undulations substantially normal to the flow of fluid through the interior of the disk, and presenting also on its outer faces series of similar undulations, and an outer casing in which said disk rotates, said casing serving to receive the counter-pressure from the fluid.

7. A rotary turbine device for the purpose specified, consisting of a hollow disk constructed interiorly with a series of undulations substantially normal to the flow of the fluid within the disk, and with a series of undulations on each of its outer faces, and a casing in which the disk rotates, said casing having a series of undulations on the inner faces of its walls, which are substantially normal to those of the disk.

8. A rotary turbine-engine, having a plurality of fixed adjutages for the supply of the fluid, a rotary part, a ring of buckets carried on the rotary part and separated by partitions provided at their inner ends each with a curved blade F, each bucket having a conduit for fluid extending through it, and said conduit having contractions formed by undulations in its lateral walls.

In witness whereof I have hereunto signed my name this 16th day of December, 1904, in the presence of two subscribing witnesses.

GASTON CHARLES EMILE DE BONNECHOSE.

Witnesses:
    JULES ARMENGAUD, Jeune,
    JOHN BAKER.